United States Patent
Artini et al.

(10) Patent No.: US 7,636,617 B2
(45) Date of Patent: Dec. 22, 2009

(54) FLIGHT CONTROL INDICATOR DISPLAYING THE AIRCRAFT'S THRUST INFORMATION

(75) Inventors: Franck Artini, Toulouse (FR); Jean-Pierre Demortier, Maurens (FR); Christophe Bouchet, Toulouse (FR)

(73) Assignee: Airbus France, Toulouse (FR)

( * ) Notice: Subject to any disclaimer, the term of this patent is extended or adjusted under 35 U.S.C. 154(b) by 479 days.

(21) Appl. No.: 11/128,298

(22) Filed: May 13, 2005

(65) Prior Publication Data

US 2005/0261810 A1    Nov. 24, 2005

(30) Foreign Application Priority Data

May 18, 2004    (FR) .................................. 04 05386

(51) Int. Cl.
*G05C 23/00*    (2006.01)
*G08B 21/00*    (2006.01)
(52) U.S. Cl. .......................... 701/3; 340/973; 340/971; 340/980; 340/945; 340/946
(58) Field of Classification Search ................. 340/973, 340/971, 980, 945, 946; 701/3, 14; 73/179, 73/117.4
See application file for complete search history.

(56) References Cited

U.S. PATENT DOCUMENTS

| | | | |
|---|---|---|---|
| 5,050,081 A | 9/1991 | Abbott et al. | |
| 6,262,674 B1 | 7/2001 | Wyatt | |
| 6,430,480 B1 * | 8/2002 | Ammar et al. | ................. 701/16 |
| 2002/0036573 A1 * | 3/2002 | Wyatt | ......................... 340/945 |
| 2002/0117582 A1 * | 8/2002 | Stephan | ................... 244/53 R |
| 2004/0004557 A1 * | 1/2004 | Sikora | ........................ 340/945 |

OTHER PUBLICATIONS

Preliminary Search Report dated Oct. 14, 2004.

* cited by examiner

*Primary Examiner*—Khoi Tran
*Assistant Examiner*—Nicholas Kiswanto
(74) *Attorney, Agent, or Firm*—Dickinson Wright, PLLC

(57) ABSTRACT

A flight control indicator for an aircraft has a set of information sources, a computation unit which determines, on the basis of information emanating from the set of information sources, an item of information regarding actual thrust of an engine of the aircraft, and a display device which is a head-up display device and which presents, on a display screen, an indication of the item of information regarding actual thrust. The item of information regarding actual thrust is associated with a thrust scale and both are presented superimposed on the environment prevailing in front of the aircraft.

11 Claims, 2 Drawing Sheets

FLIGHT CONTROL INDICATOR DISPLAYING THE AIRCRAFT'S THRUST INFORMATION

FIELD OF THE INVENTION

The present invention relates to a flight control indicator for an aircraft.

BACKGROUND OF THE RELATED ART

Such a flight control indicator is more specifically adapted to an airplane, in particular a military transport airplane, which is generally very heavy and whose maneuvering times are relatively long.

Although not exclusively, the present invention applies more particularly to low-altitude flight. The expression low-altitude flight is intended to mean flight along a flight trajectory (at low altitude) allowing an aircraft to follow as closely as possibly the terrain over flown, in particular to avoid being pinpointed. A low-altitude flight trajectory such as this is therefore situated at a terrain height which is generally less than a predetermined height, for example 500 feet (around 150 meters).

A low-altitude flight trajectory such as this may comprise rectilinear climb and descent segments. This flight trajectory is computed, taking account in particular:
  of a speed preset selected by the crew;
  of the predicted weight of the aircraft over the trajectory;
  of the maximum climb and descent capabilities of the aircraft (given by a standard model of performance); and
  of a given thrust, for example the maximum continuous thrust MCT for the climb preset and the idle (or idling thrust) for the descent preset.

In this case, if the computed slope of the flight trajectory is not correct, that is to say if it is larger than the maximum slope able to be reached (in particular on account of a model of performance of the aircraft which is too optimistic, of meteorological conditions which have not been taken into account correctly, or of an error in the computation of the maximum climb slope), when the aircraft is controlled by an automatic thrust control system ("auto-thrust" system), the thrust is increased in such a way as to reach and maintain the requested slope, while retaining the selected speed preset. The thrust may then increase until it reaches the limit value of maximum thrust of said automatic thrust control system. When this limit value is reached, the speed begins to drop, and this may of course lead to a very dangerous situation, especially when the speed of the aircraft on dropping approaches the stalling speed. Moreover, in general, the throttle does not move through the gate, when the thrust is adjusted automatically in this way.

Consequently, the pilot of the aircraft is not furnished with sufficient information regarding in particular the thrust engendered, in such a situation which is liable to be very dangerous, as indicated hereinabove.

SUMMARY OF THE INVENTION

An object of the present invention is to remedy these drawbacks. It relates to a flight control indicator for an aircraft, making it possible to provide a pilot of the aircraft with valuable aid in monitoring the thrust.

To this end, according to the invention, said flight control indicator, of the type comprising:
  a set of information sources;
  a computation unit which is connected to said set of information sources; and
  a display device which comprises at least one display screen and which is connected to said computation unit, is noteworthy in that:
  said computation unit determines, on the basis of information emanating from said set of information sources, at least one item of information regarding actual thrust of at least one engine of the aircraft; and
  said display device is a head-up display device and presents, on the display screen, at least one means of indication which indicates said item of information regarding actual thrust, which is associated with a thrust scale, and which is presented, with said thrust scale, superimposed on the environment prevailing in front of the aircraft (namely a presentation per engine or an overall presentation for all the engines).

Thus, by virtue of the invention, the pilot is furnished with an item of information regarding actual thrust, specified hereinbelow.

The presentation of this item of information regarding actual thrust provides valuable aid in the monitoring of the behavior of the aircraft, in particular when it is flown automatically with the aid of an automatic thrust control system, as indicated previously. This presentation of an item of information regarding actual thrust is also beneficial when a pilot flies the aircraft while looking through said head-up display, and while controlling the thrust manually. Consequently, the flight control indicator in accordance with the invention provides definite comfort to the flight control and increases the safety of the flight.

In a first embodiment, said computation unit determines, as item of information regarding actual thrust, the mean current thrust of all the engines of the aircraft, and said display device presents, on said display screen, a single means of indication which indicates said mean current thrust.

In a second embodiment, said computation unit determines n items of information regarding actual thrust corresponding respectively to the current thrusts of each of the n engines of the aircraft, n being an integer, and said display device presents, on said display screen, n different means of indication which indicate respectively, on respective associated thrust scales, said current thrusts of the n engines of the aircraft.

Advantageously, said thrust scale comprises:
  a first limit of minimum thrust of an automatic thrust control system; and
  a second limit of maximum thrust of an automatic thrust control system (or of the thrust used to compute the slope).

Furthermore, advantageously, said thrust scale furthermore includes, an auxiliary limit of maximum thrust available on the basis of the engines of the aircraft.

Additionally, advantageously, said display device presents, moreover, on said display screen, associated with said thrust scale, an auxiliary means of indication indicating a commanded thrust.

Furthermore, in a particular embodiment, said set of information sources supplies said computation unit with at least thrust values relating, respectively:
  to the actual effective thrust, engendered by at least one engine of the aircraft;
  to minimum and maximum thrusts of an automatic thrust control system; and
  to a maximum available thrust.

In this case, preferably, said thrust value relating to the actual effective thrust engendered by an engine, represents one of the following values:
  the work rate of the low-pressure compressor of this engine;

the engine pressure ratio (high pressure/low pressure) of this engine; and the true torque of said engine.

BRIEF DESCRIPTION OF THE DRAWINGS

The figures of the appended drawing will elucidate the manner in which the invention may be embodied. In these figures, identical references designate similar elements.

DETAILED DESCRIPTION

Figure 1:
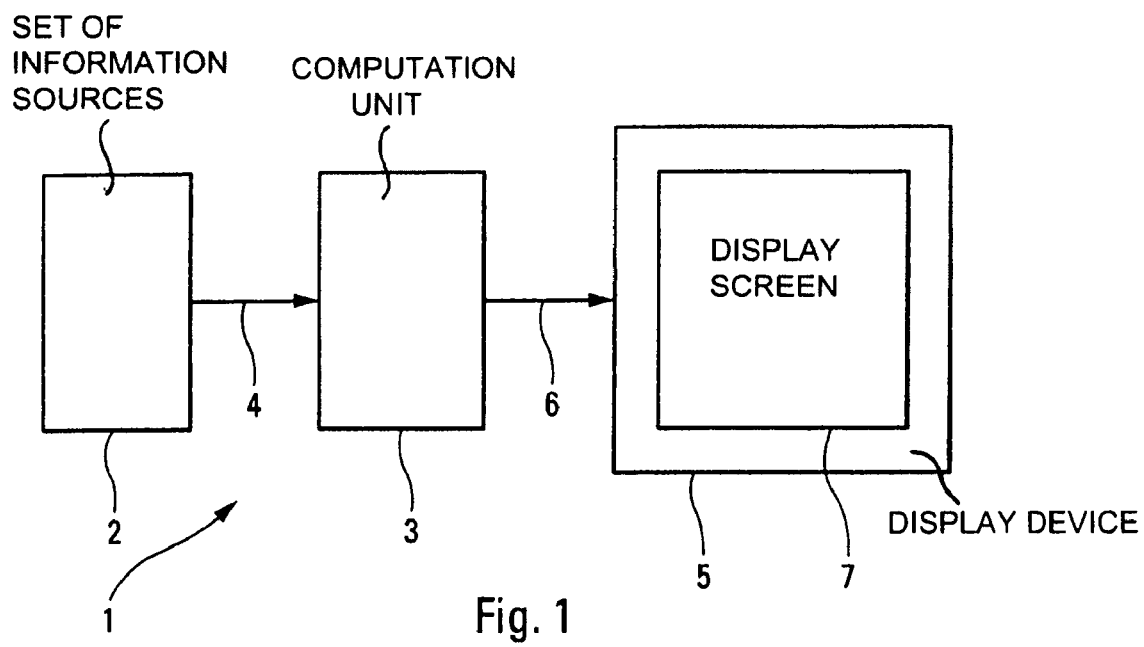
FIG. 1 is the schematic diagram of a flight control indicator in accordance with the invention.

The flight control indicator 1 in accordance with the invention and represented diagrammatically in FIG. 1 is intended to aid a pilot of an aircraft, in particular of a military transport airplane, while flying this aircraft.

To do this, said flight control indicator 1 which is carried aboard the aircraft, comprises:

a set 2, specified hereinbelow, of information sources;

a computation unit 3 which is connected by a link 4 to said set 2 of information sources; and a device 5 which is connected by a link 6 to said computation unit 3 and which comprises a display screen 7.

According to the invention:

said set 2 of information sources supplies said computation unit 3 with at least thrust values relating, respectively:

to the actual effective thrust, engendered by at least one engine of the aircraft. In a preferred embodiment, said thrust value relating to the actual effective thrust engendered by an engine, represents one of the following values (received directly from the engine or from a standard means of supervision of the engine):

the work rate N1 of the low-pressure compressor of this engine;

the engine pressure ratio of this engine EPR;

the true torque of said engine;

to minimum and maximum thrusts of an automatic thrust control system; and to a maximum available thrust;

said computation unit 3 determines, on the basis of at least the aforesaid information emanating from said set 2 of information sources, at least one item of information concerning the actual thrust of at least one engine of the aircraft; and said device 5 is a head-up display device and presents, on the display screen 7, at least one means of indication 8, 9:

which indicates said item of information regarding actual thrust;

which is associated with a thrust scale 10 specified hereinbelow; and which is presented, with said thrust scale 10, superimposed on the environment prevailing in front of the aircraft, as represented for example in FIGS. 2 and 3.

Figure 2:
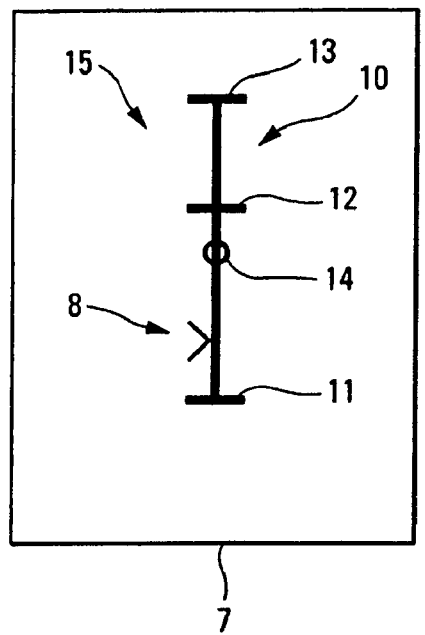
FIGS. 2 and 3 illustrate a display implemented by a flight control indicator, in accordance with a first embodiment, in a first and a second variant respectively.
Figure 3:
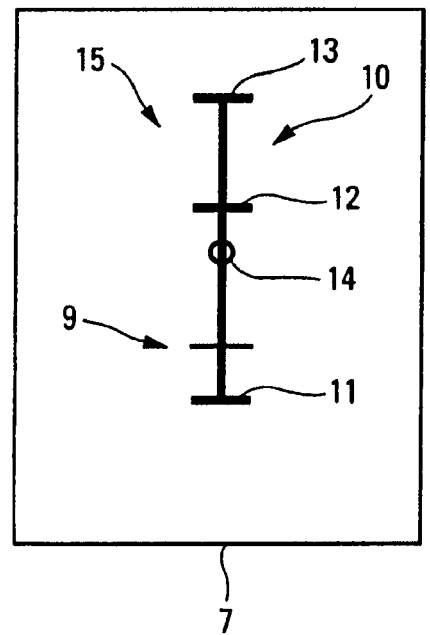

In a first variant of display represented in FIG. 2, said means of indication 8 is illustrated by an arrow ("ladder scale"), while in a second variant of display represented in FIG. 3, said means of indication 9 is illustrated by a bar.

Moreover, said thrust scale 10 which illustrates the thrust domain of a standard automatic thrust control system, that is to say the domain of possible values of the thrust when this automatic thrust control system is active, comprises:

a first limit 11, for example a bar, illustrating the minimum thrust of said automatic thrust control system, preferably the idling thrust; and a second limit 12, for example a bar, representing the maximum thrust of said automatic thrust control system, preferably the thrust at maximum slope or the maximum continuous thrust MCT.

Said thrust scale 10 moreover comprises an auxiliary limit 13, for example also a bar, indicating the maximum thrust available on the basis of the engines of the aircraft, in particular a thrust of TOGA ("Take-Off/Go-Around") type.

Additionally, the flight control indictor 1 in accordance with the invention also exhibits an auxiliary means of indication 14, for example a circle, which indicates on the thrust scale 10 the thrust commanded, that is to say the thrust corresponding to the command addressed to the engine(s). By comparing said means of indication 8, 9 and said auxiliary means of indication 14, a pilot knows the response of the engine or engines to the thrust command that he has issued. He is thus aware of how the aircraft is lying on the slope: correct slope or incorrect slope, that is to say too steep for the aircraft (in this case, the thrust demanded of the engine in order to hold this slope is greater than the computation thrust).

The thrust scale 10 and the elements located therein (limits 11 to 13, means of indication 8, 9, 14) form an indicator set 15.

The present invention is especially beneficial when the aircraft is guided, automatically or manually, along a flight trajectory which is computed on the basis of a thrust preset and speed preset.

More particularly, although not exclusively, the present invention applies to the guidance along a low-altitude flight trajectory, comprising a plurality of successive climb and descent segments that are limited by maximum climb and descent slopes, computed on the basis:

of a performance model for the aircraft;

of the predicted weight of the aircraft over the flight trajectory; and of a speed preset selected by the pilot, when the aircraft is controlled by an automatic thrust control system, while assuming that an engine is faulty (so that the aircraft can continue to fly along the trajectory, even if an engine is faulty), and by taking account of the maximum continuous thrust for the other engines (assumed not to be faulty). Moreover, the slopes of these rectilinear segments are adjusted, between the aforesaid maximum slopes, in such a way that the aircraft flies as near as possible above the terrain, as a function of its performance ratings.

The flight control indicator 1 in accordance with the invention provides valuable aid with flight control:

which, when the automatic thrust control system is active (engendering active command of the thrust of the engines so as to maintain the requested trajectory and requested speed), allows the pilot to monitor, through said head-up display device 5, said item of information regarding actual thrust (means of indication 8, 9), in particular by comparing it with the theoretical thrust commanded (auxiliary means of indication 14) which was used to compute the requested slope. This avoids the need for the pilot to monitor a head-down screen and to have to continually move his head up and down during flight control; and which informs the pilot about said item of information regarding actual thrust, when he is controlling the thrust manually (by moving the throttle). This also avoids the need for the pilot to have to continuously move his head, since he knows the position of the throttle by looking at the auxiliary means of indication 14 through the head-up display device 5, as well as the response of the aircraft (means of indication 8, 9).

In a first embodiment represented in FIGS. 2 and 3, said computation unit 3 determines, as item of information regarding actual thrust, the mean current thrust of all the m engines M1, M2, M3 and M4 of the aircraft (m being an integer greater than 1), and said display device 5 presents, on said display screen 7, a single means of indication 8, 9 which indicates said mean current thrust (and hence a single indicator set 15).

Figure 4:
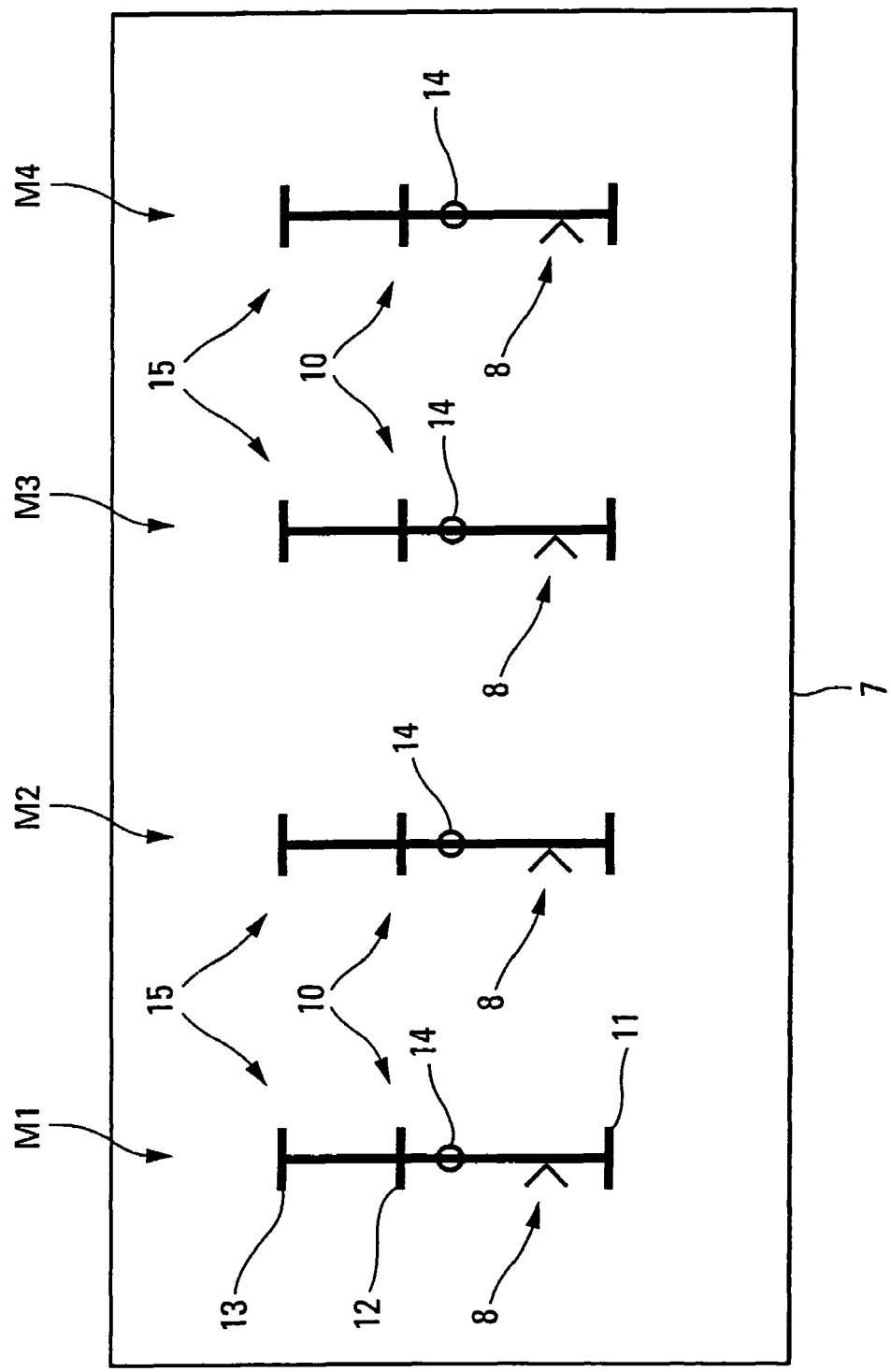
FIG. 4 illustrates a display implemented by a flight control indicator, in accordance with a second embodiment.

Furthermore, in a second embodiment represented in FIG. 4, said computation unit 3 determines n items of information regarding actual thrust, corresponding respectively to the current thrusts of each of the n engines M1, M2, M3 and M4 of the aircraft, n being an integer (which is equal to 4 in the example of FIG. 4). The display device 5 in this case presents, on the display screen 7, side by side, n different indicator sets 15 associated respectively with said n engines M1, M2, M3 and M4 of the aircraft. Each of said indictor sets 15 indicates information relating to the thrust of the corresponding engine M1, M2, M3 and M4.

This second embodiment makes it possible, as the case may be, to highlight a fault with one of said engines M1, M2, M3 and M4 and thus allows the pilot to monitor the response of the other engines (not defective) when the automatic thrust control system is activated.

The invention claimed is:

1. A flight control indicator for an aircraft, said flight control indicator comprising:
   a set of information sources;
   a computation unit which is connected to said set of information sources and which determines, on the basis of information emanating from said set of information sources, a mean current thrust of the current thrust of all engines of the aircraft; and
   a display device which is connected to said computation unit and which presents, on a display screen, a single indication of said determined mean current thrust that is associated with a thrust scale, wherein:
   said display device is a head-up display device which presents said indication and said thrust scale, superimposed on the environment prevailing in front of the aircraft, and wherein said thrust scale comprises:
      a first limit of minimum thrust of an automatic thrust control system; and
      a second limit of maximum thrust of the automatic thrust control system, and
   when the automatic thrust control system is active, said display device presents an indication of theoretical thrust commanded by said automatic thrust control system;
   said thrust scale furthermore includes an auxiliary limit of maximum thrust available on the basis of the engines of the aircraft; and
   said single indication comprises a single indicator set for representing said determined mean current thrust.

2. The flight control indicator as claimed in claim 1, wherein said display device presents, moreover, on said display screen, associated with said thrust scale, an auxiliary indication of a commanded thrust.

3. The flight control indicator as claimed in claim 1, wherein said set of information sources supplies said computation unit with at least thrust values relating, respectively:
   to the actual effective thrusts, engendered by the engines of the aircraft;
   to minimum and maximum thrusts of the automatic thrust control system; and
   to a maximum available thrust.

4. The flight control indicator as claimed in claim 3, wherein each of said thrust values relating to the actual effective thrusts engendered by the engines, represents one of the following values:
   the work rate of a low-pressure compressor of the corresponding engine;
   an engine pressure ratio of the corresponding engine; and
   a true torque of the corresponding engine.

5. An aircraft, which comprises a flight control indicator such as that specified under claim 1.

6. A flight control indicator for an aircraft, said flight control indicator comprising:
   a set of information sources;
   a computation unit which is connected to said set of information sources and which determines, on the basis of information emanating from said set of information sources, n items of information regarding actual thrust corresponding to the current thrusts of each of n engines of the aircraft, n being an integer; and
   a display device which is connected to said computation unit and which presents, on a display screen, n different indications, on respective associated thrust scales, of said current thrusts of the n engines of the aircraft, wherein:
   said display device is a head-up display device which presents said indications and said thrust scale, superimposed on the environment prevailing in front of the aircraft, and wherein said thrust scales each comprise:
      a first limit of minimum thrust of an automatic thrust control system; and
      a second limit of maximum thrust of the automatic thrust control system, and
   when the automatic thrust control system is active, said display device presents an indication of theoretical thrust commanded by said automatic thrust control system;
   each of said thrust scales furthermore includes, an auxiliary limit of maximum thrust available on the basis of the corresponding engine of the aircraft.

7. The flight control indicator as claimed in claim 6, wherein said display device presents, moreover, on said display screen, associated with each of said thrust scales, an auxiliary indication of a commanded thrust.

8. The flight control, indicator as claimed in claim 6, wherein said set of information sources supplies said computation unit with at least thrust values relating, respectively:
   to the actual effective thrusts, engendered by the n engines of the aircraft;
   to minimum and maximum thrusts of the automatic thrust control system; and
   to a maximum available thrust.

9. The flight control indicator as claimed in claim 8, wherein each of said thrust values relating to the actual effective thrusts engendered by the n engines, represents one of the following values:
   the work rate of a low-pressure compressor of the corresponding engine;
   an engine pressure ratio of the corresponding engine; and
   a true torque of the corresponding engine.

10. An aircraft, which comprises a flight control indicator such as that specified under claim 6.

11. A flight control indicator for an aircraft, said flight control indicator comprising:
- a set of information sources;
- a computation unit which is connected to said set of information sources and which determines, on the basis of information emanating from said set of information sources, a mean current thrust of the current thrust of all engines of the aircraft; and
- a display device which is connected to said computation unit and which presents, on a display screen, a single indication of said determined mean current thrust that is associated with a thrust scale, wherein:
- said display device is a head-up display device which presents said indication and said thrust scale, superimposed on the environment prevailing in front of the aircraft, and wherein said thrust scale comprises:
  - a first limit of minimum thrust of an automatic thrust control system; and
  - a second limit of maximum thrust of the automatic thrust control system, and
- when the automatic thrust control system is active, said display device presents an indication of theoretical thrust commanded by said automatic thrust control system;
- said thrust scale furthermore includes an auxiliary limit of maximum thrust available on the basis of the engines of the aircraft;
- said single indication comprises a single indicator set for representing said determined mean current thrust; and
- said display device presents, moreover, on said display screen, associated with said thrust scale, an auxiliary indication corresponding to a command addressed to the engines when a pilot of the aircraft manually controls the mean current thrust by moving the throttle.

* * * * *